United States Patent
Stählin et al.

(10) Patent No.: US 8,554,420 B2
(45) Date of Patent: Oct. 8, 2013

(54) VEHICLE UNIT

(75) Inventors: Ulrich Stählin, Eschborn (DE); Marc Menzel, Weimar/Lahn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 13/375,299

(22) PCT Filed: May 28, 2010

(86) PCT No.: PCT/EP2010/057502
§ 371 (c)(1),
(2), (4) Date: Feb. 29, 2012

(87) PCT Pub. No.: WO2010/139650
PCT Pub. Date: Dec. 9, 2010

(65) Prior Publication Data
US 2012/0150392 A1 Jun. 14, 2012

(30) Foreign Application Priority Data
Jun. 4, 2009 (DE) .......................... 10 2009 026 758

(51) Int. Cl.
*G06F 17/00* (2006.01)
(52) U.S. Cl.
USPC ............................................. 701/48; 701/45
(58) Field of Classification Search
USPC .................................................... 701/45–49
See application file for complete search history.

(56) References Cited

U.S. PATENT DOCUMENTS

| | | | |
|---|---|---|---|
| 6,532,406 B1 | 3/2003 | Schmedding | |
| 7,350,608 B2 * | 4/2008 | Fernandez | 180/65.8 |
| 7,353,897 B2 * | 4/2008 | Fernandez | 180/65.8 |
| 7,374,003 B1 * | 5/2008 | Fernandez | 180/65.8 |
| 7,575,080 B2 * | 8/2009 | Fernandez | 180/65.8 |
| 7,621,361 B1 * | 11/2009 | Fernandez | 180/65.8 |
| 7,668,182 B2 * | 2/2010 | Hetzel et al. | 370/401 |
| 7,869,920 B2 * | 1/2011 | Mark | 701/36 |
| 8,086,771 B2 * | 12/2011 | Staiger | 710/62 |
| 2002/0156554 A1 | 10/2002 | May et al. | |
| 2004/0093155 A1 | 5/2004 | Simonds | |
| 2007/0015485 A1 | 1/2007 | DeBiasio | |
| 2009/0125193 A1 * | 5/2009 | Fernandez | 701/48 |
| 2011/0054716 A1 | 3/2011 | Stählin | |

FOREIGN PATENT DOCUMENTS

| | | |
|---|---|---|
| DE | 10113321 A1 | 10/2002 |
| EP | 1058220 A1 | 12/2000 |
| WO | WO-2009101163 A2 | 8/2009 |

OTHER PUBLICATIONS

International Application Serial No. PCT/EP2010/057502, International Search Report mailed Dec. 22, 2010, 10 pgs.

* cited by examiner

*Primary Examiner* — Russell Frejd
(74) *Attorney, Agent, or Firm* — RatnerPrestia

(57) ABSTRACT

The invention relates to a vehicle unit in a vehicle, including at least one multimedia control unit and at least one safety control unit for controlling multimedia and safety functions, wherein the vehicle unit is provided as a switching unit between the multimedia control unit and the safety control unit, and wherein the switching unit processes the data received from the multimedia control unit and makes the data available to the safety control unit. The switching unit also transmits data received from the safety control unit to the multimedia control unit. Furthermore, the switching unit has a safety level which is higher than that of the multimedia control unit and lower than that the safety control unit.

7 Claims, 2 Drawing Sheets

VEHICLE UNIT

CROSS REFERENCE TO RELATED APPLICATIONS

This application is the U.S. National Stage Application of PCT/EP2010/057502, filed May 28, 2010, which claims priority to German Patent Application No. 10 2009 026 758.1, filed Jun. 4, 2009, the contents of such applications being incorporated by reference herein.

FIELD OF THE INVENTION

The invention relates to a vehicle unit in a vehicle, in particular a vehicle unit which is integrated into a communication network comprising other vehicle units in the vehicle. The vehicle is equipped with at least one multimedia control unit, for example a multimedia ECU (Electronic Control Unit), and with at least one safety control unit, for example a safety ECU, for controlling multimedia functions and safety functions. The proposed vehicle unit is provided as a switching unit between the multimedia control unit and the safety control unit, wherein the switching unit or a computer which is provided in the switching unit is configured to process data received from the multimedia control unit and to make said data available to the safety control device.

BACKGROUND OF THE INVENTION

The term multimedia control unit is intended to be understood in a wide sense in this document and to relate to all devices in the vehicle which are associated with the term "multimedia" or "infotainment". These are, in particular, telematics applications (for example map displays, a navigation system or the like), voice communication applications (mobile radio or mobile radio applications), entertainment electronics (radio, television, video or the like) as well as data interfaces with user devices (Bluetooth, W-LAN or the like) which vehicle occupants carry with them and would like to integrate into the vehicle electronics system. These applications have in common the fact that they do not perform any safety-related functions in the vehicle.

Such safety-related functions are reserved for safety control devices which include, in particular, driver assistance systems which, when hazardous situations are detected by vehicle sensors (vehicle dynamics sensors), environment sensors (sensors which sense the surroundings of the vehicle) or vehicle-to-vehicle or vehicle-to-surroundings communication (C2C or C2X communication)—with C2X communication comprising C2C communication as a special case— engage actively in the control of the vehicle, for example by means of emergency braking. Examples of this are ADAS (Advanced Driver Assistance System) or ESC (Electronic Stability Control).

Until now, the systems in the vehicle were separated into systems or units with high safety requirements, that is to say systems which are necessary for safe operation of the vehicle and/or which increase the safety of the vehicle, and such systems which serve to provide entertainment and information to the driver, such as navigation systems or radio units. This differentiation results from the different requirements made of the reliability of the multimedia systems and of the safety systems. Safety units which participate in the safety systems are developed on a "safety-driven" basis, while multimedia units of the multimedia systems have to keep up with developments in consumer electronics and are therefore developed on a "feature-driven" basis.

The multimedia units which are developed on a "feature-driven" basis have a multiplicity of functions which are to be quickly integrated into the vehicle units, but in the case of incorrect operation or in certain situations lead to malfunctions and, under certain circumstances, to the system failing, which system then has to be restored by a restart. This does not have any further significant effects in the case of multimedia functions since they only serve to entertain and inform the driver, with the result that a restart or a malfunction does not have any effects on the safety of the vehicle.

In contrast, safety units which relate to vehicle functions which are directly relevant to safety or which inform the driver about safety risks, have direct effects on the safety in road traffic. For this reason, significantly more stringent demands are made of the reliability and stability of these systems. These systems are developed substantially more slowly and are so robust that in a normal case they do not fail and, under certain circumstances, can even cope with the failure of some electronic components through redundancies which are provided.

For this reason, such safety units are very expensive to develop so that the two worlds in the vehicle electronics are usually kept separate. In some cases it is possible to bring about communication between the two worlds via a vehicle communication network, but the said network then does not need to satisfy the stringent safety requirements. However, when the two worlds are connected and information is exchanged over these system boundaries, the various basic requirements ("feature-driven" versus "safety-driven") constitute a problem since a safety system is developed significantly more slowly and owing to the rapid development cycles a multimedia unit does not have to focus on compliance with safety criteria, for example according to IEC 61508 or the analogous automotive standard. These systems are developed significantly more quickly so that difficulties increasingly occur at the communication interfaces between these two problems.

WO 2009/101163 A2, which is incorporated herein, discloses a vehicle system for carrying out navigation and providing driver assistance with a navigations unit, a provider unit, a sensor unit and a driver assistance system, in which the navigation unit supplies, as part of a multimedia control unit, map excerpts from the surroundings on the map to a provider unit which reconciles these data with further sensor information or other information and generates a map of the surroundings of the vehicle which is used by the driver assistance system to be able to react suitably in hazardous situations. This system runs according to the keyword "assistance horizon" and is used, for example, in the ADAS system as eHORIZON. While the navigation unit, as a multimedia unit, is developed with only low safety requirements, it is desirable for the provider unit as the unit which makes available the horizon for the driver assistance system that this unit has a high safety level so that in the interface between the navigation unit and the provider unit the transition from a system which is developed on a "feature-driven" basis to a system which is developed on a "safety-driven" basis takes place and the provider unit constitutes a correspondingly high value and expensive unit. In this context, it is problematic that the multimedia control units are developed quickly and, under certain circumstances, interfaces and functions are no longer standardized in a replaceable fashion with respect to the provider unit. This requires modification of the provider unit, but this proceeds more slowly and is significantly more expensive since the interface itself must again satisfy the stringent safety requirements.

SUMMARY OF THE INVENTION

The present invention aims to make available a more flexible interface between the multimedia control units and the safety control units in a vehicle here.

This is achieved according to aspects of the invention with a vehicle unit in a vehicle comprising at least one multimedia control unit and at least one safety control unit for controlling multimedia functions and safety functions, wherein the vehicle unit is provided as a switching unit between the multimedia control unit and the safety control unit, and wherein the switching unit processes data received from the multimedia control unit and makes said data available to the safety control unit, wherein the switching unit also passes on data received from the safety control unit to the multimedia control unit, and in that the switching unit has a higher safety level than the multimedia control unit and a lower safety level than the safety control unit. In this context, there is provision that the switching unit which is proposed according to aspects of the invention is also configured to pass on data received from the safety control unit to the multimedia control unit (in the sense of a switching unit which communicates bidirectionally), which easily permits a bidirectional communication flow without the safety control unit itself having to be connected to an interface of a multimedia control unit with a relatively low safety stage. Furthermore, the switching unit is distinguished according to aspects of the invention by the fact that in the switching unit a higher safety level is reached than in the multimedia control unit and a lower safety level is reached than in the safety control unit, with the result that the switching unit is more cost-effective to manufacture and develop and can be more quickly adapted to changing requirements of the "feature-driven" multimedia control units without the highly safety-relevant safety control units having to be adapted. This switching unit therefore connects the two "feature-driven" and "safety-driven" worlds and therefore functions as an interface between the multimedia world and the safety world.

The switching unit can be embodied here as one or more Electronic Control Units (ECU), but this does not have the same safety requirements (SIL—Safety Integrity Level) as the safety world but rather a significantly higher SIL classification than the multimedia world. This intermediate safety level already permits a real-time capability of the switching unit and a certification of the software as well as complete system monitoring. As a result, catastrophic faults which can have effects on the functioning of the safety devices are avoided. However, the efficiency of this switching unit is reduced compared to the multimedia units, and this is due to the higher system safety.

In order to reach this average safety level between the relatively high safety level of the safety control unit and the relatively low safety level of the multimedia control unit it is possible, in particular, to provide that the switching unit is configured in particular to carry out system monitoring continuously. This can be embodied in such a way that in the event of a fault the switching unit outputs a fault message which informs both the user and the safety devices about the malfunction, so that both the driver and the safety devices can adapt to the absence of the available information and possible restarting is carried out.

According to one development of the proposed vehicle unit, the switching unit can have, for the purpose of connecting to the various other vehicle units, at least one connection for a multimedia control unit and at least one connection for a safety control unit. The connections can then have, in particular, different safety levels, preferably in each case the safety level of the connected unit.

In this case, it is, for example, possible according to aspects of the invention to make the connections to the multimedia control unit capable of being configured so that they can easily be adapted to various multimedia control units or newer generations of equipment.

For this purpose, it is particularly advantageous according to aspects of the invention if the switching unit has a plurality of computing units, one computing unit of which serves to configure the interface and is designed in such a way that, irrespective of the external interface with the multimedia control unit, it makes available at an internal interface a precisely defined standard which can be interrogated by the other computing unit in a closed system with the safety level of the switching unit. As a result, a configurable first interface is easily made available without the need to intervene in the system of the second interface with the safety control units. The first computing unit of the switching unit can therefore also have a lower safety level than the second or further computing units of the switching unit, with the result that configuration interventions by the user or workshops which connect new equipment can be permitted. In such a system, the system monitoring of the switching unit is preferably integrated into the computing unit with the relatively high safety level, with the result that faults during the configuration of the first computing unit with a relatively low safety level can be reliably detected and signaled.

According to a further embodiment of the vehicle unit, when there are a plurality of computing units with different safety levels, the switching unit can be configured such that the computing unit carries out pre-processing of the data for a direct bidirectional ad hoc network radio communication, positioning (position detection) on the basis of satellite position data, map data, vehicle-to-surroundings communications data (which also includes the vehicle-to-vehicle communication), vehicle sensor data and/or environment sensor data and determination of the expected road profile and traffic profile (representation of the environment).

The determination of the expected road profile and traffic profile can be an eHORIZON prediction or merely a preparation of this prediction in the sense of a map of the surroundings of the vehicle which is made available. Preparation of the data for the bidirectional ad hoc network radio communication can, in particular, mean processing of the data within the scope of the ITS standard for a DSRC or ITS-G5 radio communication, wherein all the ITS layers or only the ITS layers which correspond to the processing of the content of the data can be processed in the computer unit of the switching unit. More detailed information on the standards of the various ITS layers can be found on the Internet at "www.standards.its.dot.gov", so that more detail will not be given here at this point on the type of DSRC or ITS-G5 communication according to the ITS standard (ITS—Intelligent Transportation System).

Vehicle sensors are preferably sensors which sense the state of the vehicle or the state of vehicle components, in particular their state of movement. These can be distance sensors, speed sensors, steering wheel angle sensors, rotational speed sensors, yaw rate sensors and the like. Environment sensors are understood in the document to mean sensors which sense the environment of the vehicle, wherein the environment sensors are mounted on the vehicle and sense objects or states in the vehicle's environment autonomously, i.e. without information signals from the outside. This includes, in particular, cameras, radar sensors, lidar sensors, ultrasound sensors or the like.

The DSRC or ITS-G5 system according to the ITS standard is preferably used for the vehicle-to-vehicle communication or the vehicle-to-surroundings communication.

According to aspects of the invention, the switching unit can be embodied integrated in a housing. However, according to the present invention a switching unit can also be divided among a plurality of module units, wherein each of the module units preferably has its own computing unit. Each of these module units has here a safety level which is raised compared to the multimedia control unit and a safety level which is lowered compared to the safety control unit. In this context, all the module units of the switching unit can preferably have the same safety level. However, it is also possible to make the safety levels different in accordance with the functions which are performed. This is appropriate, for example, when individual module units are provided with connections to multimedia control units, and other module units are provided for performing functions and, if appropriate, further module units are provided for safety control units. The provision of various module units is not restricted to the fact that each module unit has a separate housing. It is also possible according to aspects of the invention for various module units to be provided in a common housing, wherein the module units in this case are preferably logically separated so that the individual module units can easily be replaced separately and internal, preferably standardized interfaces are formed between the module units.

In this case, it is particularly advantageous if the plurality of module units of the switching unit each have connections for connecting to other module units of the switching unit, which connections preferably correspond to the safety level of the respective module units, wherein, when there are different module units the highest safety level is preferably selected. These connections particularly easily also permit the module units which are embodied, for example, as plug-in cards also to be replaced.

According to a further preferred embodiment, it is appropriate to integrate a mobile radio unit with an emergency call unit into the switching unit since it is desirable to operate an emergency call unit with a raised safety level so that this telematics function can also be integrated into the switching unit with the safety level which is higher compared to multimedia control units. In addition, the switching unit can be configured to generate a representation of the environment in the sense of a map of the vehicle's environment, which representation can be used, for example, as a horizon (eHORIZON) for driver assistance systems (for example ADAS—Advanced Driver Assistance System).

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
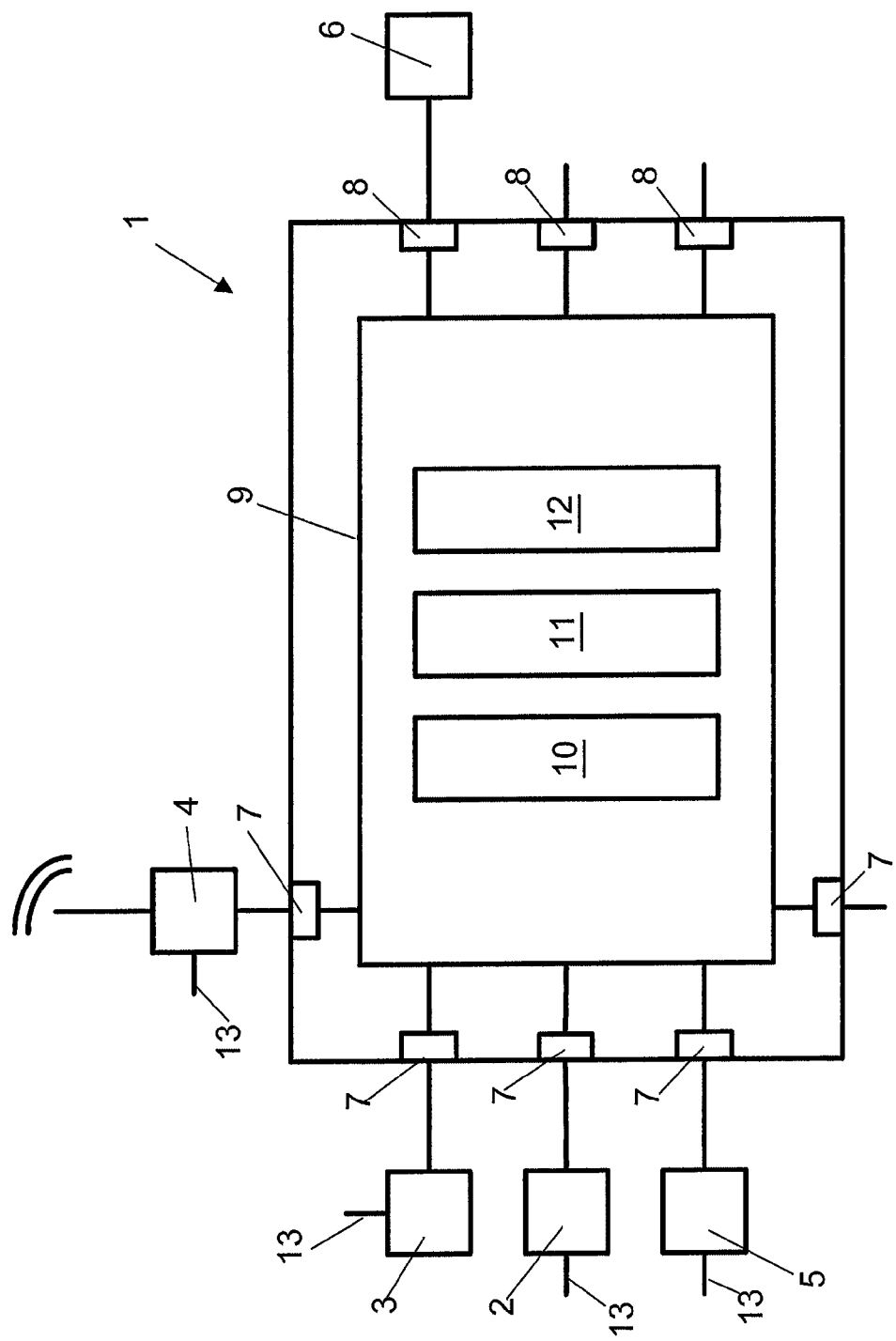
FIG. 1 is a schematic view of a switching unit according to aspects of the invention in a vehicle network according to a first embodiment.

FIG. 1 illustrates a vehicle unit 1 according to aspects of the invention which is embodied as a switching unit and which is located in a vehicle having at least one multimedia control unit 2, 3, 4. The multimedia control unit 2 is embodied as a radio and entertainment unit. The multimedia control unit 3 constitutes a telematics or navigation unit and the multimedia control unit 4 is an intelligent antenna via which a cellular mobile radio communication, a satellite communication and a vehicle-to-vehicle communication or vehicle-to-surroundings communication can be carried out. For the vehicle-to-vehicle or vehicle-to-surroundings communication, the term C2X communication is also selected below, said C2X communication being preferably carried out according to the ITS standard by means of DSRC or ITS-G5 communication. A vehicle sensor and/or environment sensor unit 5 is also present as a further unit.

In addition, the vehicle is equipped with a safety control device 6 which can be embodied as a driver assistance system, for example an ADAS—Advanced Driver Assistance System. The multimedia control units 2, 3, 4 have a substantially lower safety standard than the safety control unit 6, which are reflected in different safety levels of the SIL level (Safety Integrity Level).

The cause of this is the different development of the various units. The multimedia control units are embodied in such a way that new, commercially available features are quickly also integrated. This "feature-driven" development means that when new features are integrated into the units, under certain application conditions faults may occur which lead to a failure of the applications and, under certain circumstances, even require restarting of the applications so that the latter resume their function. This is not acceptable in safety control devices which relate immediately to the safety of the vehicle and carry out, for example, driver assistance functions. For this reason, these safety control units have a substantially higher SIL level. These safety control units 6 are developed on a "security driven" basis, i.e. the development was carried out so carefully and the electronic elements used in the units are so reliable that failure of the system is extremely improbable. This development means that new features are integrated into this unit only very hesitantly and after detailed tests, with the result that the development speeds for the two systems diverge. This makes it more difficult to connect these two systems in the vehicle. Nevertheless, it is desirable to connect multimedia control units 2, 3, 4 and safety control units 6 in the vehicle system and, for example, to exchange information. For this purpose, the invention proposes the switching unit 1 to which the multimedia control units 2, 3, 4, the safety control unit 6 and the vehicle sensor and/or environment sensor unit 5 are connected. The latter can have a higher or a lower SIL level depending on the quality and design.

For connection to the switching unit, connections 7 with a low safety level are provided for connecting the multimedia control units 2 to 4 and the vehicle sensor unit and environment sensor unit 5, wherein the invention is not restricted to the specifically mentioned units, as is indicated by the free connection 7 in FIG. 1.

The safety control unit 6 is, on the other hand, connected to the switching unit 8 via a connection 8 with a high safety level, wherein further connections 8 for connecting to further safety control units can also be provided here.

Both the connections 7 with a low safety level and the connections 8 with a high safety level are connected to a computing unit 9 of the switching unit 1. However, the connections 7 with a low safety level and the connections 8 with a high safety level differ in that the connections 7 can be configured by means of the computing units 9 and can be adapted to the respectively connected multimedia control unit 2 to 4 or vehicle sensor unit or environment sensor unit 5 or the electronic components which are used are more favorable. The connection 8 with a high safety level is, on the other hand, not easy to configure and already meets the stringent safety requirements of the safety control unit 6 depending on its safety level. As a result it becomes clear that the switching unit 1 is provided for connecting to one another the multimedia control units 2 to 4 and the safety control units 6 with their different safety levels and/or generally vehicle units with different safety levels, and for permitting flexible communication between these units.

In addition to setting up such a connection, for the exchange of data in both directions, between the units 2, 3, 4, 5 with a low safety level and the units 6 with a high safety level, the computing unit 9 of the switching unit 1 can also be configured to carry out certain tasks. In this context, for example, a representation 10 of the environment, a positioning operation 11 and a communication pre-processing operation 12 are illustrated here without the invention being restricted to these tasks which are particularly advantageously implemented in the switching unit. The representation 10 of the environment serves to map the current surroundings of the vehicle by means of a type of map or horizon which can be used as an input variable of the safety control devices 6 so that a driver assistance system 6 knows the surroundings of the vehicle and in hazardous situations can react in a way which is adapted to the surroundings of the vehicle. A known application for this is eHORIZON in conjunction with the ADAS driver assistance system. The method of function of such a representation of the environment is disclosed in WO 2009/101163, so further explanations in this regard will be dispensed with.

A further task which the computing unit 9 of the switching unit 1 can perform is a positioning operation 11 on the basis of satellite signals, for example GPS, map information, C2X communication and vehicle sensors and/or environment sensors. Various techniques, which can replace or improve the satellite locating processes, can be used for the determination of the position of the driver's own vehicle. The objective therefore is to combine all the methods for positioning in the switching unit and to make available to the vehicle a uniform position which is as accurate as possible and which can be transmitted both to multimedia control units 2 and to safety control units 6. Possible techniques for the positioning operations are GPS, Galileo or other satellite-supported locating systems, a positioning operation by means of WLAN, a positioning operation by means of mobile radio, map data, vehicle sensors, such as wheel speed sensors, steering wheel angle sensors, yaw rate sensors, and environment sensors such as, for example, cameras of a subsequent triangulation evaluation or landmark evaluation, transponders etc., wherein some of the abovementioned techniques can also be used only in a supportive fashion and do not permit a complete positioning process of the vehicle.

This application is particularly advantageous because all the vehicle units, or as many vehicle units as possible, are connected to the switching unit 1, so that communication can easily take place via the switching unit and all the data and information is available there. Of course, it cannot be ruled out that the individual multimedia control units 2 to 4 and sensor units 5 also communicate with one another via a vehicle communication network 13, while bypassing the switching unit 1.

A further appropriate application in the computing unit 9 of the switching unit 1 is pre-processing of C2X information, in particular within the scope of the ITS standard (Intelligent Transportation System). The objective here is to compress the data obtained and to extract relevant objects and events, to validate data, to generate or to determine meta data for fusion with environment sensors, to select and to bridge gaps in reception and to compensate for problems by means of data protection, for example by means of a change of ID.

The switching unit 1 can carry out all the tasks 10 to 12 here or else only perform individual tasks or only permit communication between vehicle units with different safety levels in a bidirectional fashion, with the result that the multimedia control units 2, 3, 4 or comparable units, such as sensor units 5, can transmit data to the safety units 6, and data from the safety control units 6 can also be displayed or used in multimedia control units 2 to 5.

It is therefore also possible to equip, as a switching unit 1, for example a unit for representation 10 of the environment with the corresponding connections 7, 8, and if appropriate, further tasks such as the positioning operation 11, and to integrate further tasks such as the positioning process 11 and the communication pre-processing operation 12 also into the unit for representation 10 of the environment, with the result that this unit can operate as a switching unit 1 according to the present invention.

The same is also possible for a telematics unit, in particular an emergency call unit, which should preferably also operate at a higher safety level than a customary multimedia control unit 2, with the result that this unit can particularly advantageously form the switching unit 1 according to aspects of the invention. A vehicle sensor or environment sensor unit 5 also frequently operates with a higher safety level than a pure multimedia control unit 2, since the data of the sensors which are connected to the sensor unit 5 are frequently to be conveyed through safety control units 6. For this reason, the switching unit 1 according to aspects of the invention could also be integrated into such a sensor cluster 5.

Figure 2:
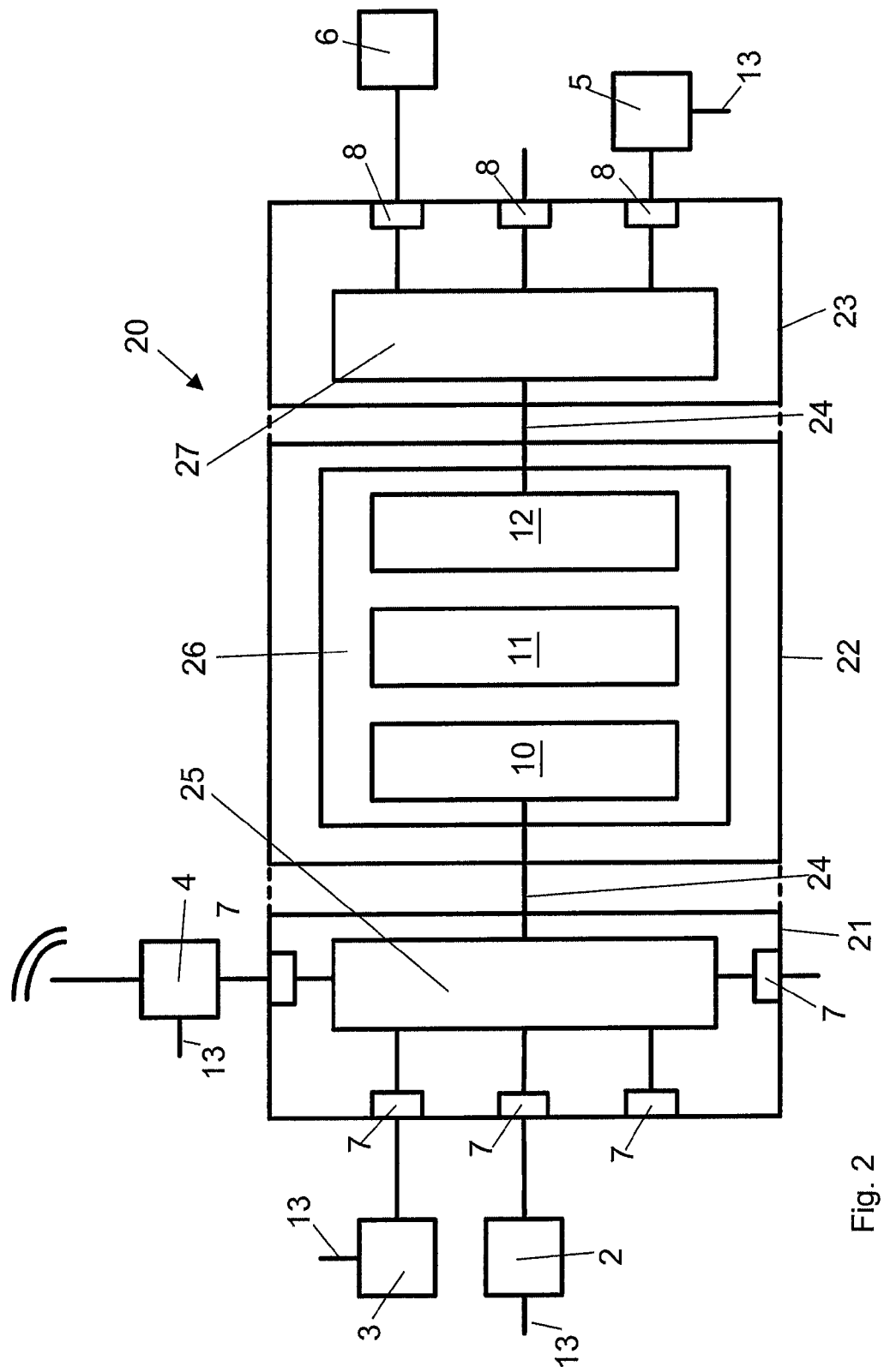
FIG. 2 is a schematic view of a switching unit according to aspects of the invention in a vehicle network according to a second embodiment.

FIG. 2 shows an alternative embodiment of a switching unit 20 whose basic function corresponds, however, to that of the switching unit 1 and is therefore no longer described in detail below. The same reference numbers as in FIG. 1 are used for the same functions or connected units.

However, the switching unit 20 is of modular design and has three different modules. A first module is a connection module 21 with connections 7 with a low safety level. The second module is a function module for carrying out certain tasks and the third module is a connection module 23 with connections 8 with a high safety level. All the modules 21, 22, 23 of the switching unit 20 are connected to one another via an internal interface 24 and each have a computing unit 25, 26 and 27. The computing units 25 and 27 of the connection modules 21 and 23 are each designed to correspondingly address the connections 7 with a low safety level or the connections 8 with a high safety level, respectively, wherein the computing unit 25 in particular permits configuration of the connections 7. On the basis of this configuration possibility, the connection module 21 has a lower safety level than the function module 22 and the connection module 23, which according to aspects of the invention have the same safety level. However, the connection module 21 preferably also has a higher safety level than the multimedia control units 2 to 4. The safety level of the function module 22 and preferably also that of the connection module 23 are below the safety level of the safety control units 6. Since the vehicle sensor and/or environment sensor unit 5 according to FIG. 2 has a higher safety level than in FIG. 1, the latter is directly connected to a connection 8 with a high safety level in the connection module 23, wherein the sensor data can be exchanged between the various modules 21, 22, 23 of the switching unit 2 via the internal interface 24 and can each be output bidirectionally via all the connections 7, 8.

The function module 22 comprises, in a computing unit 26, the tasks of representation 10 of the environment, the positioning operation 11 and the communication pre-processing operation 12 as well as, if appropriate, further tasks such as, in particular, the communication connection of vehicle units with different safety levels to one another.

LIST OF REFERENCE NUMBERS

1 Switching unit
2 Multimedia control unit, radio and entertainment unit
3 Multimedia control unit, telematics and navigation unit
4 Multimedia control unit, antenna unit
5 Vehicle sensor and/or environment sensor unit
6 Safety control unit, driver assistance system
7 Connection with a low safety level
8 Connection with a high safety level
9 Computing unit
10 Representation of the environment
11 Positioning operation
12 Communication pre-processing operation
13 Vehicle communication network
20 Switching unit
21 Connection module with connections 7
22 Function module
23 Connection module with connections 8
24 internal interface, connection
25 Computing unit
26 Computing unit
27 Computing unit

The invention claimed is:

1. A vehicle unit in a vehicle comprising:
at least one multimedia control unit having a first safety level, and at least one safety control unit having a second safety level for controlling multimedia functions and safety functions respectively,
wherein the vehicle unit includes a switching unit having a third safety level between the multimedia control unit and the safety control unit,
wherein the switching unit is configured to:
process data received from the multimedia control unit and the safety control unit, and
control transfer of the processed data, by controlling a connection to the multimedia control unit and a connection to the safety control unit based on the first and second safety levels respectively, such that the connection to the safety control unit is more restricted than the connection to the multimedia control unit, and
wherein the third safety level is higher than the first safety level, and lower than the second safety level.

2. The vehicle unit as claimed in claim 1, wherein system monitoring of the switching unit takes place.

3. The vehicle unit as claimed in claim 1, wherein the switching unit has at least one connection for the multimedia control unit and at least one connection for the safety control unit, which connections have different safety levels.

4. The vehicle unit as claimed in claim 1, wherein the switching unit carries out pre-processing of the data for a bidirectional ad hoc network radio communication, positioning on the basis of satellite position data, map data, vehicle-to-surroundings communications data, vehicle sensor data and/or environment sensor data and/or representation of the environment for determining the expected road profile and traffic profile.

5. The vehicle unit as claimed in claim 1, wherein the switching unit is divided among a plurality of module units.

6. The vehicle unit as claimed in claim 5, wherein the module units of the switching unit have connections for connecting to the other module units of the switching unit.

7. The vehicle unit as claimed in claim 1, wherein a mobile radio unit with an emergency call unit is integrated into the switching unit.

* * * * *

UNITED STATES PATENT AND TRADEMARK OFFICE
CERTIFICATE OF CORRECTION

PATENT NO.        : 8,554,420 B2                                           Page 1 of 1
APPLICATION NO. : 13/375299
DATED             : October 8, 2013
INVENTOR(S)       : Stählin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 55 days.

Signed and Sealed this
Fifteenth Day of September, 2015

Michelle K. Lee
*Director of the United States Patent and Trademark Office*